United States Patent [19]
Fima

[11] 4,185,204
[45] Jan. 22, 1980

[54] MOTOR VEHICLE WITH REMOTE BATTERY CONNECTOR

[75] Inventor: Raoul G. Fima, Mission Viejo, Calif.
[73] Assignee: Jumpak Products, Inc., Anaheim, Calif.
[21] Appl. No.: 873,363
[22] Filed: Jan. 30, 1978
[51] Int. Cl.² ............................................. H02G 3/00
[52] U.S. Cl. ............................. 307/10 R; 307/10 BP
[58] Field of Search ...................... 307/10 R, 9, 10 B; 339/10, 43, 36, 44

[56] References Cited

U.S. PATENT DOCUMENTS

| | | | |
|---|---|---|---|
| 3,312,770 | 4/1967 | McKenna | 339/36 |
| 3,942,027 | 3/1976 | Fima | 307/10 R |

*Primary Examiner*—L. T. Hix
*Assistant Examiner*—S. D. Schreyer

[57] ABSTRACT

A motor vehicle is provided with a remote battery connector at a location from which its battery terminals are not accessible. The connector includes a single terminal for connection to a jumper cable, the companion jumper cable being connected to the grounded body structure of the vehicle. The remote terminal is enclosed within a mounting box that includes a base and a hinged cover, the cover top being supported in its closed position by a pair of guide walls disposed on opposite sides of the terminal. Securement of the mounting box to the vehicle is by the terminal itself so that installation is quickly and easily accomplished. When the mounting box cover is opened, an illuminated indicia shows the location of the terminal and its proper polarity.

3 Claims, 9 Drawing Figures

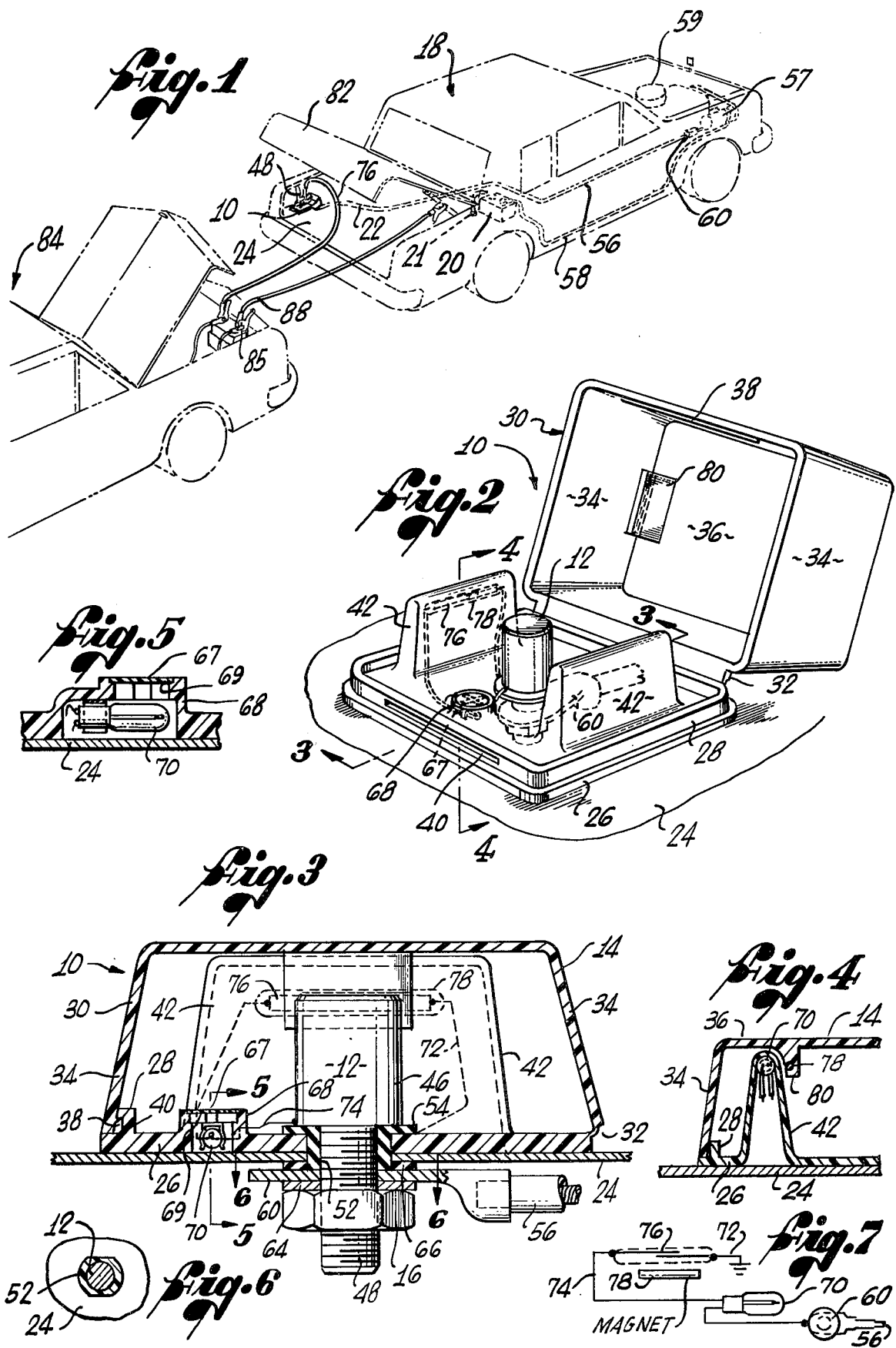

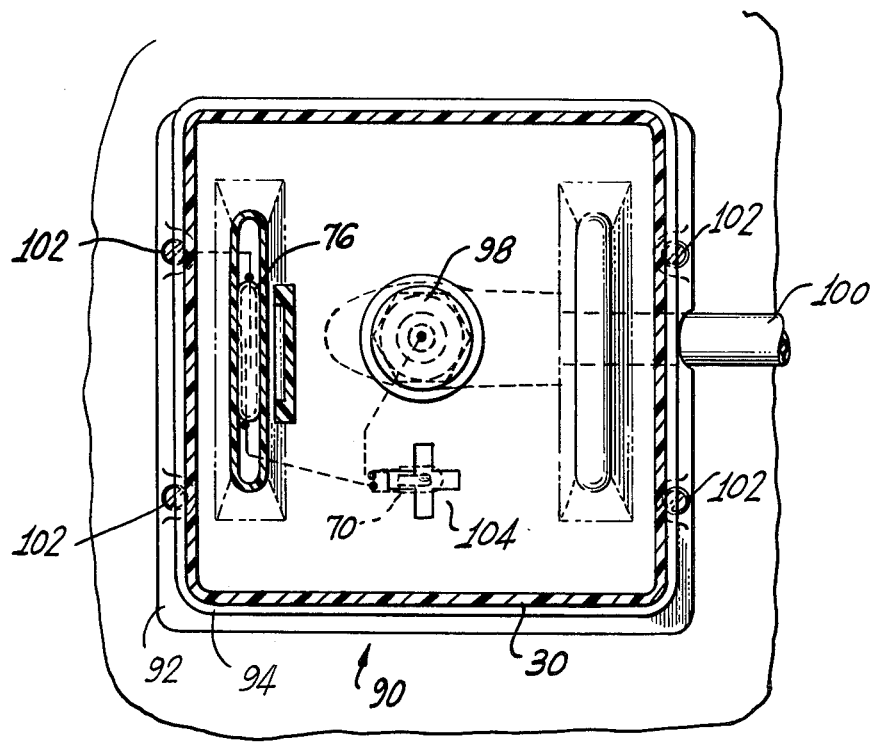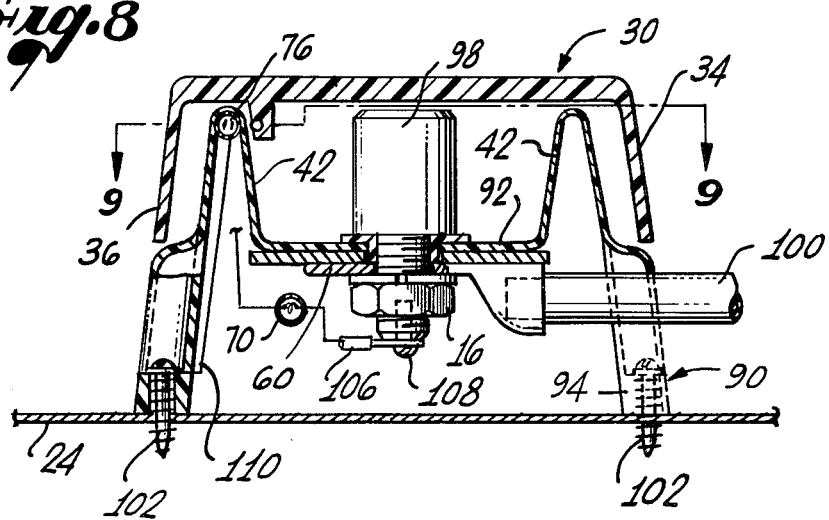

MOTOR VEHICLE WITH REMOTE BATTERY CONNECTOR

BACKGROUND OF THE INVENTION

The present invention relates to vehicle electrical systems, and, more particularly, to the provision of a remote battery connector that facilitates jump starting.

An electric storage battery is commonly located at the front of a vehicle in the engine compartment. When it is desired to jump start the engine, it is usually necessary to position a second vehicle front end to front end with the first so that jumper cables can reach from one battery to the other. In some situations, jumper cables can connect two vehicles parked side by side, but either arrangement is apt to be dangerous, especially where the disabled vehicle is parked alongside a busy roadway. Moreover, a disabled vehicle is often located in a garage or against a wall where it is not possible to position the second vehicle as desired. The difficulties presented by the conventional battery-in-engine-compartment design are greatly magnified in the case of automobiles, particularly sports cars and other small automobiles that have the battery located inside the passenger compartment, usually under the rear seat.

The automobile's electrical system can be damaged and a fire or explosion may be caused if the terminals are inadvertently cross-connected. During an attempt to connect jumper cables hurriedly, a cross-connection may result from a failure to correctly identify the positive and negative terminals.

A highly successful solution to the problem presented by the inaccessibility of battery terminals is explained in this inventor's U.S. Pat. No. 3,942,027. A metal terminal box mounted in the trunk of a vehicle presents two battery terminals, one formed by a portion of the box itself and the other formed by a post mounted on the box and insulated therefrom. The post is connected by a cable to a battery terminal while the other terminal is grounded by four mounting screws securing the box to a body panel such as the floor of the trunk.

An objective of the present invention is to increase the ease of installation of remote battery connectors and to reduce the cost of manufacturing while at the same time maintaining or improving their reliability and durability. A further objective is to reduce the size and weight of the remote connector in view of the demand for smaller, lighter cars. A still further objective is to reduce the likelihood of damage to the vehicle's electrical system due to human error during a jump start.

SUMMARY OF THE INVENTION

The present invention resides in a motor vehicle equipped with an improved remote battery connector that accomplishes the above objectives. A single remote terminal is provided at a location on the vehicle from which the battery terminals are not accessible. A mounting box of non-conducting construction surrounds the remote terminal and electically isolates it from the body structure. An insulated cable connects the remote terminal to the appropriate battery terminal.

To jump start the vehicle's engine, a first jumper cable is connected to the remote terminal and to the electrically corresponding battery terminal of a second vehicle. A second jumper cable is connected to the body structure of the vehicle to be started and to the remaining battery terminal of the second vehicle. Since the second remote terminal of the prior art connector is eliminated, the danger of a cross-connection is greatly reduced while the size and cost of the device are minimized.

According to a more detailed aspect of the invention, the remote terminal takes the form of a post extending through an aperture in the body structure and secured by a fastener. The mounting box is secured and positioned by the remote terminal and the fastener.

The mounting box includes a base and a cover that can be releasably secured in a position in which it shields the remote terminal. It can be further provided with a pair of parallel guide walls that extend upwardly from the base on opposite sides of the terminal. Not only do these walls guide the jumper cable clip toward the remote terminal and prevent unintended electrical contact with other parts of the vehicle, but they can supportively engage the cover top when it assumes its closed position, thus giving the mounting box considerably greater strength.

To further reduce the chances of a cross-connection, the box can be provided with an illuminated indicia of the polarity of the remote terminal. In a preferred embodiment, this indicia is illuminated by a lamp controlled by a magnetically responsive switch disposed in one of the guide walls. The cover carries a magnet which causes the switch to be open when the cover is closed, but when the cover is open the switch closes to illuminate the indicia.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a pictorial representation of two vehicles, one of which is being used to jump start the other, the vehicle to be started being equipped with a remote battery connector constructed in accordance with the present invention;

FIG. 2 is an enlarged pictorial view of the remote battery connector of FIG. 1, shown with its mounting box cover in an open position;

FIG. 3 is a cross-sectional view of the connector taken along the line 3—3 of FIG. 2, but with the cover in a closed position;

FIG. 4 is a fragmentary, cross-sectional view taken along the line 4—4 of FIG. 2, showing a portion of the mounting box with the cover in its closed position;

FIG. 5 is a further enlarged cross-sectional view of the mounting box taken along the line 5—5 of FIG. 3, showing the indicia and an accompanying light source;

FIG. 6 is a cross-sectional view of the remote terminal and the surrounding portion of the mounting box taken along the line 6—6 of FIG. 3;

FIG. 7 is a schematic representation of the light source and its associated circuitry;

FIG. 8 is a cross-sectional side view of another remote battery connector constructed in accordance with the invention; and FIG. 9 is a cross-sectional view of the connector of FIG. 8 taken along the line 9—9.

DESCRIPTION OF THE PREFERRED EMBODIMENTS

A remote battery connector 10 that embodies many novel features of the present invention is illustrated in FIGS. 1–7 of the accompanying drawings. In general, it comprises a single remote terminal 12, a mounting box 14, and a fastener 16.

An exemplary installation of the connector 10 in a vehicle 18 and a typical jump starting arrangement are depicted in FIG. 1. The vehicle 18 is of the front engine type and has its storage battery 20 located under the rear seat where it is particularly inaccessible. It has a conventional negative ground electrical system in which the negative battery terminal is connected directly to the vehicle's body structure by a strap 21. (The term "body structure" is used herein to refer to the body panels of a vehicle, associated electrically conductive components and the frame or chassis, in the event that the vehicle is not of unit body construction.) The remote connector 10 is mounted in the trunk 22, on a floor panel 24 and to one side.

The mounting box 14 of the connector 10 is made of non-conducting molded plastic and is best shown in FIGS. 2 and 3. It has a substantially flat, rectangular base 26 that overlies a portion of the trunk floor panel 24 and carries an upstanding perimetrical rim 28. A cover 30, that also forms part of the mounting box 14, is joined to the base 26 along one edge, the joint being reduced in thickness so that it forms a hinge 32 permitting the cover to open and close. The cover 30 is also rectangular having four side walls 34 that extends downwardly from a normally horizontal top 36. With the cover 30 in its closed position, the bottom edges of the side walls 34 closely surround the rim 28.

On the inside of the cover side wall 34 opposite the hinge 32 is a longitudinal protrusion 38 that resiliently interlocks with a groove 40 on the outwardly facing side of the rim 28 when the cover is closed (as shown in FIG. 3). Thus, the protrusion 38 and groove 40 together form a latch that releasably holds the cover 30 closed.

The mounting box 14 also includes a pair of parallel, upstanding, integrally formed, plastic, guide walls 42 that project upwardly from the base 26. The height of the guide walls 42 is such that when the cover 30 is closed, the cover top 36 is supportingly engaged by the guide walls when it flexes inwardly thus preventing the cover from being crushed or otherwise damaged by any heavy objects in the trunk 22.

At the center of the base 26, between the guide walls 42, is an aperture aligned with another aperture in the floor panel 24. The apertures are partially round but have two straight parallel sides (as best shown in FIG. 6) although they may be of other non-circular configurations as well.

The remote terminal 12 consists of an electrically conductive metal post having a cylindrical top end 46 suitably dimensioned to be engaged by the alligator clip 48 of a conventional jumper cable. A lower end 48 of the post 12 is of reduced diameter and is externally threaded.

The post 12 projects through the apertures so that its cylindrical top portion 46 is contained within the mounting box 14 between the guide walls 42 and its lower portion 48 projects downwardly through the apertures and is exposed on the bottom of the floor panel 24 (FIG. 3). A non-circular collar 52 of insulating material fits between the post 12 and the base 26 and has an outwardly extending flange 54 that overlie the top surface of the base.

A principal function of the collar 52 is to electrically insulate the post 12 from the body structure of the vehicle 18. Externally, it is of a non-circular configuration that corresponds to and interlocks with that of the apertures in the floor panel 24 and mounting box 14, thereby preventing rotation of the mounting box relative to the floor panel. This non-circular shape is most suitable when the remote connector 10 is installed as part of the original equipment of the vehicle 18. In some situations, however, after market installations in particular, it may be preferable to use a circular shape, which is more easily formed, and to rely on friction to prevent the mounting box 14 from turning. In either case, it will be noted that only one aperture need be formed in the floor panel 24 or other part of the body structure to accommodate the entire connector 10 complete with all wiring. The fastener 16, which takes the form of a nut, engages the threaded lower end 48 of the post 12 and thereby secures and positions both the post 12 and the mounting box 14.

The remote terminal 12 is connected to the positive side of the vehicle's electrical system by an insulated cable 56 that extends from a positive terminal 58 on a starter motor 57 at the front of the vehicle 18, the starter being electrically connected to the positive terminal of the battery 20 by a cable 58 and mechanically engageable with to an engine 59 in the conventional manner. This cable 56 is capable of carrying sufficient current to start the engine 59, e.g., 60 amperes. A fuse 60 is inserted in the electrical path along the cable 56 for protection in the event of a short circuit. A more detailed explanation of the installation of the cable 56 may be found in the above-mentioned U.S. Pat. No. 3,942,027.

A connection between the cable 56 and the remote terminal 12 is made by a flat ring-shaped metallic member 60 that is slipped over the exposed lower end 48 of the post 12. On its lower surface, the ring 60 is separated from the fastener 16 by a conductive metal washer 64. On its top surface, an electrical insulating washer 66 that surrounds the bottom of the collar 52 separates the ring 60 from the floor panel 24.

So that the danger of an inadvertent connection of the remote terminal 12 to the wrong side of an external power supply 62 used for jump starting will be reduced and so that the remote terminal can be easily located inside a dark trunk compartment 22, the mounting box 14 is provided with an illuminated indicia 67 (best shown in FIG. 2). This indicia 67 is in the shape of a plus sign that warns a person making a connection that the remote terminal 12 is to be connected to the positive side the external power source.

The indicia 67 is formed on a raised portion 68 of the base 26 (best shown in FIGS. 2, 3 and 5) having a cut out on its top surface in the appropriate plus sign configuration with a transparent plastic window 69 glued across the top of the cut out, as best shown in FIG. 5. Disposed within a small chamber formed by the raised portion 68 is a light source 70 for the indicia 67. This light source 70 is a small lamp grounded by a wire 72 that extends between the top surface of the base 26 and the collar 52 and into contact with the floor panel 24. On the positive side, the lamp 70 is connected to the remote terminal 12 by a wire 74 that extends between the terminal 12 and the collar 52.

So that the lamp 70 will not draw current when the remote terminal 12 is not in use, a switch 76 responsive to opening and closing of the cover 30 interrupts the positive connection wire 74. The switch 76 is of the reed type and is disposed horizontally within one of the guide walls 42 along its top edge. It is resiliently biased toward a closed position, but when the cover 30 is closed a magnet 78 carried by a protrusion 80 on the underside the cover top 36 attracts one contact of the switch 76 away from the other and opens the lamp circuit, as best shown in FIG. 7. Even though the vehicle battery 22 is not capable of starting its engine 59, it will, as a general rule, provide the small current required to illuminate the lamp 70. It should be noted that the inclusion of an illuminated indicia 67 in the connector 10 need not increase the installation time substantially since the lamp 70 and its associated circuitry (shown schematically in FIG. 7) are all disposed within the base 14. No extra openings in the floor panel 24 are required.

When it is desired to jump start the vehicle 18 equipped with the remote connector 10, its trunk lid 82 is opened and a second vehicle 84 that is to provide the external power supply is positioned with its front bumper only slightly spaced from the rear bumper of the first vehicle (FIG. 1). Since the second vehicle 84 has a battery 85 located at the front end immediately behind the radiator (the most common position) a jumper cable connection to the remote terminal 12 at the rear of the first vehicle 18 is easily and safely accomplished.

The mounting box cover 36 is opened and the illuminated indicia 67 signals that the remote terminal 12 is to be connected to the positive battery terminal of the second vehicle 84. The first jumper cable 86 is so connected.

The second or negative jumper cable 88 connects the remaining battery terminal of the second vehicle 84 to the body structure of the vehicle 18 to be started. It is attached at any suitable and convenient location on the vehicle 18 where good electrical contact can be obtained but is kept away from the positive cable 86 to avoid an inadvertent short circuit.

Since the body structure of each vehicle 18, 84 is connected to the negative side of its electrical system, care must be taken when connecting and disconnecting the positive jumper cable 86 to avoid inadvertent electrical contact. The danger of such contact is greatly reduced by the presence of the guide walls 42 which closely confine the clip 48 on the end of the cable 86 as it is manipulated to engage the remote terminal 12.

An alternative form of the invention is illustrated in FIGS. 8 and 9. Most components of a remote connector 90 are similar to those of the connector 10 described above and are indicated by the same reference numbers. Only those components that differ will be described here.

A base 92 includes a plurality of vertical side walls 94 that support a raised horizontal platform 96. Instead of extending extending through the floor panel 24, a terminal post 98 is mounted in an aperture in the platform 96. A cable 100 attached to the positive side of the starter 58 extends along the top surface of the floor panel 24 through one of the side walls 94 to the lower end of the terminal 98. The connector 90 is, therefore, particularly suitable for installations in which the cable 100 extends along the interior of the vehicle rather than beneath it.

The base 92 is secured to the floor panel 24 by four small sheet metal screws 102 and it is, therefore, unnecessary to form any large installation holes. Another difference between the connector 90 of the second embodiment and that of the first embodiment described above is that a plus sign indicia 104 is formed by simply cutting away a part of the platform 96 in the shape of a plus sign and the lamp 70 is mounted beneath the platform, requiring no special raised portion 68 to accommodate it.

On the positive side, the lamp 70 is connected to line 106 secured by a small screw 108 threadedly received by an axial hole in the bottom end of the terminal 98. On its negative side, the lamp 70 is grounded by a line 110 that leads to one of the mounting screws 102. The above-described arrangement of a magnetically actuated switch 76 is employed, but in this connector 90 it is on the negative or ground side of the lamp 70.

Both forms of the invention provide compact, easily installed remote battery connectors that are convenient to use and minimize the risk of human error in making a connection. It should be remembered that the installation of FIG. 1 is merely exemplary and the best location for the remote connector depends upon the vehicle. In a rear engine vehicle, for example, it may be desirable to provide a remote battery connector at the front end.

While particular forms of the invention have been illustrated and described, it will also be apparent that various modifications can be made without departing from the spirit and scope of the invention.

I claim:

1. A motor vehicle having an electrically conductive metal body structure, an internal combustion engine mounted on said body structure, an electric starter motor mounted on said body structure and operably connectable to said engine, an electric storage battery having first and second battery terminals mounted thereon, a first conductor connecting said first battery terminal to said body structure, and a second conductor connecting said second battery terminal to said starter motor, wherein the improvement comprises:
    an aperture in said body structure at a location where said first and second battery terminals are not readily accessible;
    a single remote terminal post extending through said aperture, said terminal post being suitable for engagement by and connection to a jumper cable;
    a generally rectangular mounting box made of insulating plastic material and comprising a base, a pivotably movable cover member hingedly connected to said base, detent means for releasably securing said cover member in a predetermined closed position with respect to said base in which said terminal is shielded by said cover member, and a pair of upstanding guide walls integrally formed with said base, disposed on opposite sides of said terminal and supportively engageable by said cover member when said cover member is in said predetermined position;
    fastener means for engaging said terminal post and thereby securing said terminal post and said mounting box to said body structure; and
    an insulated cable connecting said terminal post to said second battery terminal, said cable having sufficient current carrying capacity to jump start said engine, whereby said engine can be jump started by connecting a first jumper cable to said terminal post and connecting a second jumper cable to said body structure.

2. The motor vehicle of claim 1, further comprising illumination means including a visible indication of the location and proper polarity of said remote terminal.

3. A motor vehicle having an electrically conductive metal body structure, an internal combustion engine mounted on said body structure, an electric starter motor mounted on said body structure and operably connectable to said engine, an electric storage battery having first and second battery terminals mounted thereon, a first conductor connecting said first battery terminal to said body structure, and a second conductor connecting said second battery terminal to said starter motor, wherein the improvement comprises:

- a noncircular aperture in said body structure at a location from which said battery terminals are not accessible;
- a single remote terminal post extending through said aperture, said remote terminal post being suitable for engagement by connection to a jumper cable;
- an electrically insulating collar of a noncircular configuration corresponding to said noncircular configuration of said aperture;
- a generally rectangular, plastic mounting box of electrically insulating construction and comprising a base surrounding said collar and said single remote terminal post, a pivotably movable cover member hingedly connected to said base, detent means for releasably securing said cover member in a predetermined closed position with respect to said base in which said remote terminal post is shielded by said cover member, a pair of guide walls integrally formed with said base disposed on opposite sides of said remote terminal post and supportively engageable by said cover member when said cover member is in said closed position;
- fastener means for threadedly engaging said remote terminal and thereby securing said remote terminal and said mounting box to said body structure;
- an insulated cable connecting said remote terminal to said second battery terminal, said cable having sufficient current carrying capacity to jump start said engine, whereby said engine can be jump started by connecting a first jumper cable to said remote terminal and connecting a second jumper cable to said body structure;
- illumination means including a light source for providing a visible indication of the location of said remote terminal and for indicating the proper polarity of said remote terminal;
- magnetically responsive switch means for activating said illumination means, said switch means being disposed within one of said guide walls; and
- a magnet disposed within said cover member to open said switch means in response to movement of said cover member to said predetermined closed position.

* * * * *